United States Patent
Matsumoto et al.

(10) Patent No.: US 11,153,386 B2
(45) Date of Patent: Oct. 19, 2021

(54) DATA COLLECTION DEVICE, DATA COLLECTION SYSTEM, DATA SERVER, DATA COLLECTION METHOD, AND NON-TRANSITORY COMPUTER READABLE STORAGE MEDIUM

(71) Applicant: Yokogawa Electric Corporation, Tokyo (JP)

(72) Inventors: Tomoko Matsumoto, Tokyo (JP); Naoki Yoshima, Tokyo (JP); Shigetsugu Betchaku, Tokyo (JP); Kaname Kakihara, Tokyo (JP); Toshiko Kobayashi, Tokyo (JP); Yoshitaka Yuki, Tokyo (JP); Frank Hurink, Tokyo (JP); Henk Koekoek, Tokyo (JP)

(73) Assignee: Yokogawa Electric Corporation, Musashino (JP)

( * ) Notice: Subject to any disclaimer, the term of this patent is extended or adjusted under 35 U.S.C. 154(b) by 0 days.

(21) Appl. No.: 15/962,165

(22) Filed: Apr. 25, 2018

(65) Prior Publication Data
US 2018/0316762 A1    Nov. 1, 2018

(30) Foreign Application Priority Data

Apr. 27, 2017  (JP) .............................. JP2017-088978
Aug. 24, 2017  (JP) .............................. JP2017-161351

(51) Int. Cl.
*H04L 29/08*  (2006.01)
*H04L 12/26*  (2006.01)
(Continued)

(52) U.S. Cl.
CPC .............. *H04L 67/12* (2013.01); *G06F 16/22* (2019.01); *H04L 43/067* (2013.01); *H04L 43/08* (2013.01);
(Continued)

(58) Field of Classification Search
CPC ....... H04L 67/12; H04L 43/067; H04L 43/08; H04L 43/106; H04L 67/1097; H04L 41/06; H04W 4/38; G06F 16/22
See application file for complete search history.

(56) References Cited

U.S. PATENT DOCUMENTS

2003/0051557 A1  3/2003  Ishikawa et al.
2007/0225924 A1  9/2007  Hashizume et al.
(Continued)

FOREIGN PATENT DOCUMENTS

JP       10-2449 A      1/1998
JP    H10-336272 A     12/1998
(Continued)

*Primary Examiner* — Abdulkader M Alriyashi
(74) *Attorney, Agent, or Firm* — Sughrue Mion, PLLC

(57) ABSTRACT

A data collection device includes a data collector configured to collect data from a device that outputs data, a time stamp adder configured to add a time stamp to the data collected by the data collector, a data storage configured to store the data to which the time stamp is added by the time stamp adder, a timing generator configured to generate a timing at which the data stored in the data storage is transmitted to a data server communicably connected via a first network, a request information acquirer configured to acquire request information for requesting transmission of the data, the request information being transmitted from the data server, and a data transmitter configured to transmit the data stored in the data storage to the data server based on the timing generated by the timing generator and in accordance with the request information acquired by the request information acquirer.

18 Claims, 10 Drawing Sheets

(51) Int. Cl.
*G06F 16/22* (2019.01)
*H04W 4/38* (2018.01)
*H04L 12/24* (2006.01)

(52) U.S. Cl.
CPC ........ *H04L 43/106* (2013.01); *H04L 67/1097* (2013.01); *H04W 4/38* (2018.02); *H04L 41/06* (2013.01)

(56) References Cited

U.S. PATENT DOCUMENTS

| | | | |
|---|---|---|---|
| 2011/0164551 A1 | 7/2011 | Takebe et al. | |
| 2011/0239109 A1* | 9/2011 | Nixon | G06F 17/2247 |
| | | | 715/236 |
| 2012/0197852 A1* | 8/2012 | Dutta | H04L 67/2804 |
| | | | 707/692 |
| 2014/0114456 A1* | 4/2014 | Stavropoulos | H04H 60/58 |
| | | | 700/94 |
| 2017/0074589 A1* | 3/2017 | Somary | C21D 11/00 |
| 2017/0208493 A1* | 7/2017 | Masson | H04L 67/12 |
| 2017/0251541 A1* | 8/2017 | Cavalcanti | H05B 37/0272 |
| 2018/0260298 A1* | 9/2018 | Wu | G06F 11/3438 |

FOREIGN PATENT DOCUMENTS

| | | | |
|---|---|---|---|
| JP | 2002-23832 A | | 1/2002 |
| JP | 2003-052135 A | * | 2/2003 |
| JP | 2003-52135 A | | 2/2003 |
| JP | 2003-097986 A | | 4/2003 |
| JP | 2004-213419 A | | 7/2004 |
| JP | 2005-38246 A | | 2/2005 |
| JP | 2006-195554 A | | 7/2006 |
| JP | 2007-87377 A | | 4/2007 |
| JP | 2007-256231 A | | 10/2007 |
| JP | 2011-142441 A | | 7/2011 |
| JP | 2012-108642 A | | 6/2012 |
| JP | 2013-109710 A | | 6/2013 |
| JP | 2015-141679 A | | 8/2015 |
| JP | 2016-090516 A | | 5/2016 |

* cited by examiner

FIG. 6A

| Time Stamp | SENSOR ID | DATA | Status |
|---|---|---|---|
| tA-1 | A1 | DataA1-1 | OK |
| tA-1 | A2 | DataA2-1 | OK |
| tA-2 | A1 | DataA1-2 | OK |
| tA-2 | A2 | DataA2-2 | OK |
| ... | ... | ... | ... |

FIG. 6B

| Time Stamp | SENSOR ID | DATA | Status |
|---|---|---|---|
| tB-1 | B1 | DataB1-1 | OK |
| tB-1 | B2 | DataB2-1 | OK |
| tB-2 | B1 | DataB1-2 | OK |
| tB-2 | B2 | DataB2-2 | NG |
| ... | ... | ... | ... |

FIG. 7 tA-1<tB-1<tA-2<tB-2

| Time Stamp | SENSOR ID | DATA | Status |
|---|---|---|---|
| tA-1 | A1 | DataA1-1 | OK |
| tA-1 | A2 | DataA2-1 | OK |
| tB-1 | B1 | DataB1-1 | OK |
| tB-1 | B2 | DataB2-1 | OK |
| tA-2 | A1 | DataA1-2 | OK |
| tA-2 | A2 | DataA2-2 | OK |
| tB-2 | B1 | DataB1-2 | OK |
| tB-2 | B2 | DataB2-2 | NG |
| ... | ... | ... | ... |

FIG. 9

| Time Stamp | SENSOR ID | DATA | SELF-DIAGNOSIS RESULT | ADVANCED DIAGNOSIS RESULT |
|---|---|---|---|---|
| tC-1 | C1 | DataC1-1 | SD-C1-1 | AD-C1-1 |
| tC-2 | C1 | DataC1-2 | SD-C1-2 | - |
| tC-3 | C1 | DataC1-3 | - | AD-C1-2 |
| tC-4 | C1 | DataC1-4 | - | - |
| ... | ... | ... | ... | ... |

DATA COLLECTION DEVICE, DATA COLLECTION SYSTEM, DATA SERVER, DATA COLLECTION METHOD, AND NON-TRANSITORY COMPUTER READABLE STORAGE MEDIUM

BACKGROUND

Technical Fields

The present invention relates to a data collection device, a data collection system, a data server, a data collection method, and a non-transitory computer readable storage medium.

Priority is claimed on Japanese Patent Application No. 2017-088978, filed Apr. 27, 2017, and Japanese Patent Application No. 2017-161351, filed Aug. 24, 2017, the contents of which are incorporated herein by reference.

Related Art

In the related art, in plants such as industrial plants such as chemical plants, plants that manage and control wells such as gas fields or oil fields, transportation facilities for gas, oil or the like, and surroundings thereof, plants that manage and control power generation such as hydraulic power, thermal power, nuclear power, or the like, plants that manage and control renewable power generation such as solar power, wind power, or the like, or plants that manage and control sewage, dams, or the like, factories, or the like (hereinafter collectively referred to as a "plant"), a distributed control system (DCS), a supervisory control and data acquisition (SCADA) system, or the like are built, and an advanced automatic operation has been realized. In DCS and SCADA, field devices, such as a measuring device or an operating device, and a control device that controls the field devices are connected via a communication means.

In such a control system, a control device such as a programmable logic controller (PLC) collects data from data input devices such as a plurality of sensors to control a plant and transmits the collected data to a host system that monitors the plant. Transmission of data to the host system is performed, for example, at a fixed time (a predetermined time) or over a fixed period (a predetermined period). Further, data is accumulated in a data buffer or the like, and when the amount of accumulated data reaches a predetermined value, a data buffer transmits data to the host system.

Further, there is a device that adds a time stamp indicating a time when data has been collected from a data input device to the collected data, and transmits resultant data (see, for example, Japanese Unexamined Patent Application Publication No. 2015-141679 and Japanese Unexamined Patent Application Publication No. 2011-142441).

Further, failures occurring in a data input device such as a sensor installed in a plant include an abnormality caused by a failure or the like of the data input device itself, and an abnormality caused by a measurement environment of the data input device even when the data input device itself is normal. Examples of an abnormality caused by the measurement environment include adhesion of an insulating object to a sensor that measures electrode impedance, blockage of impulse-line for measuring pressure, and generation of air bubbles at the time of flow rate measurement in a data input device. There are devices that can measure abnormalities caused by this measurement environment (see, for example, Japanese Unexamined Patent Application Publication No. 2003-097986, Japanese Unexamined Patent Application Publication No. 2007-256231, and Japanese Unexamined Patent Application Publication No. 2016-090516).

However, in the control system of the relate art, since data to be transmitted to the host system is temporarily stored in a data buffer or the like and transmitted, a delay occurs before the data is transmitted to the host system after the data is acquired from the data input device, and the data cannot be monitored in real time in the host system.

Further, when the timing precision or a timing at which the time stamp is added in a device that adds a time stamp differs in a case in which time stamps are added to data, analysis of the data based on a time of the time stamp may not be able to be performed in the host system.

Further, when a communication status becomes unstable due to long distance communication between the data input device or the data buffer and the host system or the use of a telephone line, data collection may not be able to be performed in the host system.

Further, when a problem occurs in the data input device, for example, the deviation from the acquired data may increase and the reliability of the data may be degraded.

SUMMARY

A data collection device may include a data collector configured to collect data from a device that outputs data, a time stamp adder configured to add a time stamp to the data collected by the data collector, a data storage configured to store the data to which the time stamp is added by the time stamp adder, a timing generator configured to generate a timing at which the data stored in the data storage is transmitted to a data server communicably connected via a first network, a request information acquirer configured to acquire request information for requesting transmission of the data, the request information being transmitted from the data server, and a data transmitter configured to transmit the data stored in the data storage to the data server based on the timing generated by the timing generator and in accordance with the request information acquired by the request information acquirer.

Further features and aspects of the present disclosure will become apparent from the following detailed description of exemplary embodiments with reference to the attached drawings.

BRIEF DESCRIPTION OF THE DRAWINGS

FIG. 6A is a diagram illustrating an example of data stored in a data collection device in the embodiment.

FIG. 6B is a diagram illustrating an example of data stored in a data collection device in the embodiment.

FIG. 7 is a diagram illustrating an example of data stored in the data server in the embodiment.

FIG. 9 is a diagram illustrating another example of the data stored in the data collection device in the embodiment.

DETAILED DESCRIPTION OF THE EMBODIMENTS

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide a data collection device, a data collection system, a data server, a data collection method, and a non-transitory computer readable storage medium that enable stable and reliable analysis based on a time stamp of data acquired from a data input device.

Hereinafter, a data collection device, a data collection system, a data server, a data collection method, and a non-transitory computer readable storage medium according to an embodiment of the present invention will be described in detail with reference to the drawings.

Figure 1:
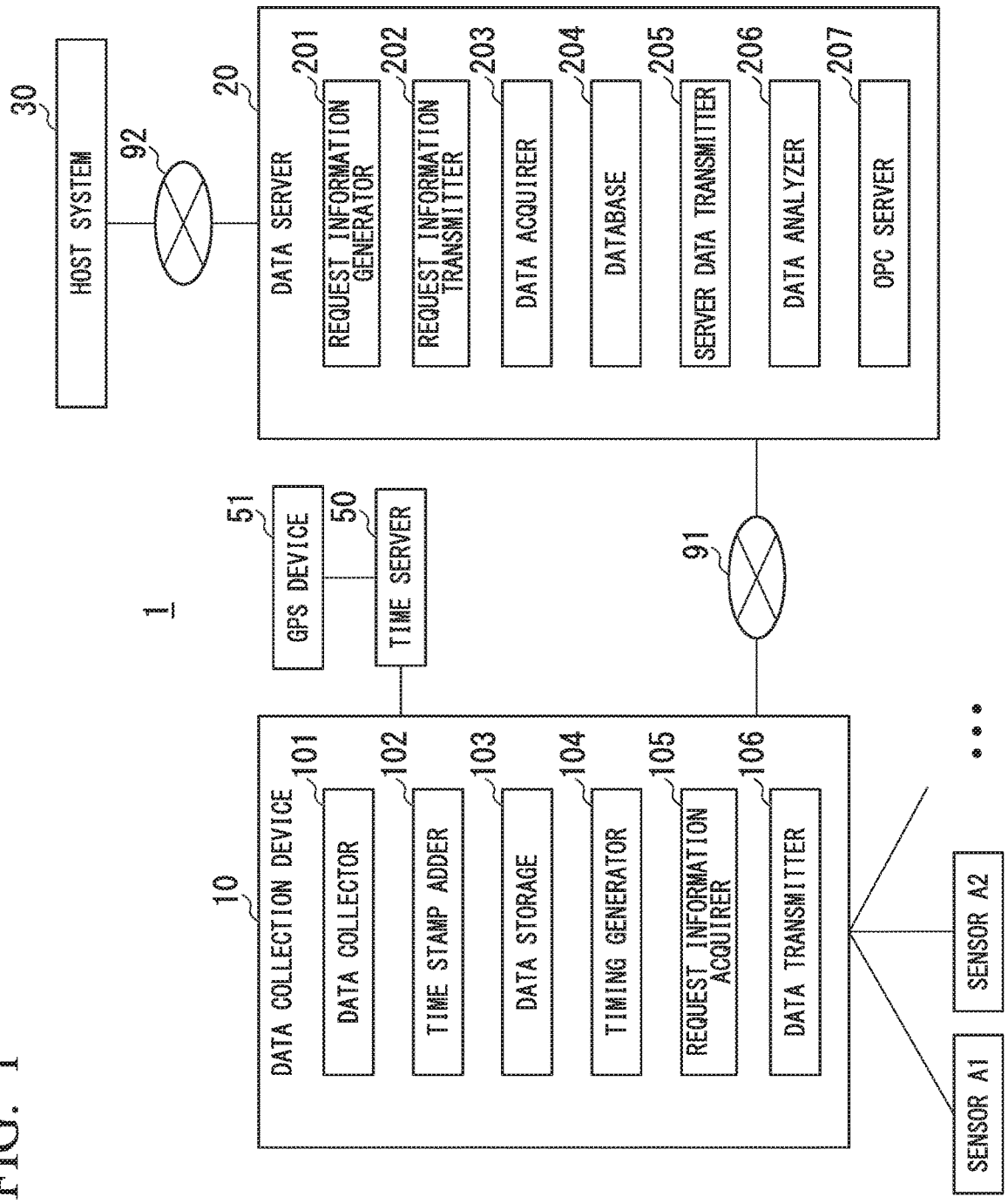
FIG. 1 is a block diagram illustrating an example of a software configuration of a data collection system including a data collection device in an embodiment.

First, a software configuration of the data collection system will be described with reference to FIG. 1. FIG. 1 is a block diagram illustrating an example of a software configuration of the data collection system including the data collection device according to an embodiment.

In FIG. 1, the data collection system 1 includes a data collection device 10, a data server 20, and a host system (managing device) 30. The data collection device 10 has respective functions of a data collector 101, a time stamp adder 102, a data storage 103, a tuning generator 104, a request information acquirer 105, and a data transmitter 106. The data server 20 has respective functions of a request information generator 201, a request information transmitter 202, a data acquirer 203, a database 204, a server data transmitter 205, a data analyzer 206, and an OPC server 207. Further, the data collection device 10 is connected to a GPS device 51 via a time server 50. The data server 20 is connected to the time server 50 via the GPS device 51. Further, the data collection device 10 and the data server 20 are connected via a first network 91. Further, the data server 20 and the host system 30 are connected via a second network 92.

Each of the functions in the data collection device 10 in the embodiment is a functional module realized by a data collection program (software) for controlling the data collection device 10. Further, each of the functions in the data server 20 is a functional module realized by a data server program (software) for controlling the data server 20.

The data collection device 10 is connected to a plurality of sensors (a sensor group) such as a sensor A1 and a sensor A2. The data collection device 10 is, for example, a control device such as a PLC or a device that instructs the control device such as the PLC to perform an operation. The sensor A1 or the like is a data input device (hereinafter also abbreviated as a "device") that generates data (an electrical signal) indicating a physical quantity (pressure, temperature, or the like) of a differential pressure gauge, a thermometer, a flow rate meter, or the like. The data collection device 10 acquires data from the sensor group and controls, for example, a process of a plant (not illustrated). The number and type of sensors connected to the data collection device 10 are arbitrary.

The data collector 101 collects data output from the sensor group such as the sensor A1 illustrated as the device. The data collector 101 is, for example, a program for controlling an input module for data collection of a PLC. That is, the data collector 101 may be a program of the PLC or a program for instructing the PLC to perform an operation. The input module of the PLC enables, for example, an analog input of 6 channels or 12 channels of one module. The data collected by the data collector 101 is, for example, a current value of 4 to 20 mA or a voltage value of 0 to 5 V. The data collector 101 converts the current value collected by the input module into a digital value (AD conversion).

The data collector 101 collects status information indicating whether or not the device that outputs data is normal, together with the data. For example, a device such as a sensor that outputs important data that is used for process control can output a measurement value of the sensor and output status information indicating whether or not the sensor is operating normally. The data collector 101 can improve the reliability of acquired data by collecting the status information together with the data.

The time stamp adder 102 adds a time stamp to the data collected in the data collector 101. The time stamp is time information indicating a date and time, and is added to the data collected by the data collector 101. The time stamp adder 102 acquires the time information from the time server 50.

The data storage 103 stores the data to which the time stamp has been added. The data storage 103 includes, for example, a hard disk drive (HDD), a random access memory (RAM), or the like.

When the data collector 101 acquires the status information indicating whether or not the device is normal, the data storage 103 stores the acquired status information together with the data.

The timing generator 104 generates a timing (signal) for transmitting the data stored in the data storage 103 to the data server 20 communicably connected via the first network 91. The timing generator 104, for example, determines whether or not a predetermined sampling period has elapsed, and generates a timing in each sampling period. The timing generator 104 may generate the timing by determining whether or not a number of data items or the amount of data stored in the data storage 103 has reached a predetermined value. For example, when a plurality of data collection devices are connected to the data server 20, the timing generators 104 of the respective data collection devices may asynchronously generate the timings.

The request information acquirer 105 acquires request information for requesting transmission of data, which is transmitted from the data server 20 in response to a request from the host system 30 communicably connected to the data server 20 via the second network 92. The host system 30 sends a data acquisition request to the data server 20. In response to the acquisition request transmitted from the host system 30, the data server 20 transmits request information for requesting data transmission to the data collection device 10. The request information acquirer 105 acquires the request information transmitted in a communication protocol of the first network 91 from the data server 20. The data server 20 may be configured to operate independently when the host system 30 does not exist.

The data transmitter 106 transmits the data stored in the data storage 103 to the data server 20 via the first network 91 based on the timing generated by the timing generator 104 or according to the request information acquired by the request information acquirer 105. That is, the data transmitter 106 can autonomously transmit the data based on the timing generated by the timing generator 104, and can transmit the data in response to the request from the host system 30. Therefore, for example, when there is no large change in the data of the device, a transmission frequency can be lowered and a communication load in the second network can be reduced at a timing having a long period generated by the timing generator 104. On the other hand, for example, when a large change occurs in the data of the device, data can be provided in accurate and precise resolution by transmitting the data at a high transmission frequency in a short period in response to demanding from the host system 30.

When the data collector 101 has acquired the status information indicating whether or not the device is normal, the data transmitter 106 transmits the acquired status information together with the data to the data server 20. When the device has a function of issuing an alarm (ALARM) when the device is detected the abnormal status, the data transmitter 106 can also transmit the alarm (ALARM) to the data server.

The data transmitter 106 monitors a communication status indicating whether or not communication with the data server 20 via the first network 91 is possible based on the timing generated by the timing generator 104 or according to the request information acquired in the request information acquirer 105. The data transmitter 106 generates a transmission event (an upload event) when the communication status indicates that communication is possible. In the transmission event, the data transmitter 106 transmits (uploads) the data stored in the data storage 103 to the data server 20. On the other hand, when the communication status indicates that communication is not possible, the data transmitter 106 waits for the communication status to indicate that communication is possible. Accordingly, even when the communication status of the first network 91 is unstable, it is possible to reliably transmit data.

Note that the first network 91 may include a communication path for wireless communication. For example, in a case in which a distance between the data server 20 and the data collection device 10 is long, an installation cost of the first network 91 can be reduced by performing wireless communication between the data server 20 and the data collection device 10 in some cases. For wireless communication, for example, mobile communication may be used. The data transmitter 106 transmits data to the data server 20 through wireless communication.

Further, although the case in which a so-called push-type transmission in which a transmission timing is determined in the data transmitter 106 is performed as transmission of data from the data transmitter 106 to the data server 20 has been described, so-called pull-type transmission in which the data transmitter 106 requests the data server 20 to acquire data and an acquisition timing is determined in the data server 20 may be performed.

The time server 50 is a server that provides time information to the data collection device 10. The time server 50 acquires global positioning system (GPS) information from the GPS device 51 and provides time information included in the GPS information to the data collection device 10.

Incidentally, when the communication between the time server 50 and the data collection device 10 is slow or is interrupted, the time information provided to the data collection device 10 becomes unstable. Therefore, it is desirable that the time server 50 and the data collection device 10 can communicate stably. In the embodiment, it is possible to perform stable communication by directly connecting the data collection device 10 to the time server 50 without passing through a network. Therefore, for example, in a data collection system in which a plurality of data collection devices 10 disposed at remote locations are connected to the data server 20, it is desirable to provide the time server 50 for each data collection device 10. It is possible to improve a time accuracy of the time stamp by providing the time server 50 for each data collection device 10.

Note that the time server 50 may acquire the time information from information other than GPS information. For example, the time server 50 may perform time adjustment using a network time protocol service for providing a standard time. Accordingly, accurate time information can be provided to the data collection device 10 even in, for example, an indoor location where it is difficult to receive radio waves from a GPS satellite.

As described above, the data server 20 has the respective functions of the request information generator 201, the request information transmitter 202, the data acquirer 203, the database 204, the server data transmitter 205, the data analyzer 206, and the OPC server 207.

The request information generator 201 generates request information for requesting the data collection device 10 to transmit data in response to a request from the host system 30. The request information is, for example, a command conforming to the protocol of the first network 91. The data server 20 is communicably connected to the data collection device 10 via the first network 91 and is communicably connected to the host system 30 via the second network 92. That is, the request information generator 201 generates request information conforming to the protocol of the first network 91 based on the request from the host system 30 conforming to the protocol of the second network 92. For example, when the first network 91 is a network using a telephone line, the request information generator 201 generates request information in a command conforming to a protocol of the telephone line.

The request information transmitter 202 transmits the request information generated by the request information generator 201 to the data collection device 10 via the first network 91. The request information transmitter 202 monitors the communication status of the first network 91 and transmits the request information when the communication status indicates that communication is possible, similar to the data transmitter 106.

The data acquirer 203 acquires the data that is transmitted from the data collection device 10. The data transmission from the data collection device 10 is executed by the transmission event generated in the data transmitter 106 as described above. The data acquirer 203 acquires the data transmitted in the transmission event. The data acquirer 203 can acquire status information indicating whether or not the device is normal together with the data. When the device has a function of issuing an alarm (ALARM) when the device is detected the abnormal status, it is also possible to transmit the alarm (ALARM) to the data server.

The database 204 stores the data acquired in the data acquirer 203. The database 204 is, for example, database software, and the data is stored in a storage medium such as an HDD or a RAM. For example, the database 204 may store the acquired data together with device information such as status information of the device that outputs the data.

The server data transmitter 205 transmits the data stored in the database 204 to the host system 30 via the second network 92. The server data transmitter 205 controls communication conforming to the protocol of the second network 92. The server data transmitter 205 may transmit the data using an OPC server function of the OPC server 207 described below.

The data analyzer 206 determines whether or not the data stored in the database 204 satisfies a predetermined condition. The predetermined condition is, for example, a case in which a rate of change in data over time is equal to or greater than a predetermined numerical value. The data analyzer 206 determines whether or not the stored data satisfies a preset condition.

The OPC server 207 has a function of an OPC server. OPC is a standard in which an interface for communication with a device or an application in an industrial field or the like is defined. The OPC server 207 transmits and receives data to and from an OPC compliant device or application via an OPC interface. The OPC interface defined in the OPC specification includes, for example, an OPC data access (OPC-DA) interface or an OPC historical data access (OPCHDA) interface. OPC-DA is an interface for real-time communication. OPCHDA is an interface for log data access. Log data is stored in the database 204 and used using OPCHDA. For example, the OPC server 207 can switch between OPC-DA and OPCHDA according to analysis results of the data analyzer 206 and use OPC-DA or OPCHDA. For example, when the rate of change in the data over time in the analysis result of the data analyzer 206 is smaller than a predetermined numerical value, the OPC server 207 may transmit the non-transmitted data stored in the database 204 to the host system 30 using OPC-DA. Further, in the analysis results of the data analyzer 206, when the rate of change in the data over time is equal to or greater than the predetermined numerical value, the OPC server 207 may transmit a history of data including the data transmitted in the past using OPCHDA to the host system 30.

The host system 30 acquires and uses data output by the device from the data server 20. The data output by the device is stored in the data storage 103 as described above, and further stored in the database 204. Therefore, for example, even when the communication status of the first network 91 or the second network 92 is unstable, there is redundancy that enables the data transmission to be reliably performed.

Note that, although the case in which, in the data collection system 1, one data collection device 10 is connected to the data server 20 is illustrated in FIG. 1, the number of data collection devices 10 connected to the data server 20 is arbitrary. For example, a plurality of data collection devices may be connected to the first network 91, and the data server 20 may acquire data from the plurality of data collection devices. Each data collection device asynchronously transmits data to the data server 20 at the timing generated by each timing generator.

Further, the respective functions of the data collector 101, the time stamp adder 102, the data storage 103, the timing generator 104, the request information acquirer 105, and the data transmitter 106 included in the data collection device 10 have been described as being realized by software, as described above. However, at least one of the functions of the data collection device 10 may be realized by hardware. The respective functions of the request information generator 201, the request information transmitter 202, the data acquirer 203, the database 204, the server data transmitter 205, the data analyzer 206, and the OPC server 207 included in the data server 20 have been described as being realized by software, as described above. However, at least one of the functions of the data server 20 may be realized by hardware.

Further, any of the functions of the data collection device 10 may be implemented by dividing one function into a plurality of functions. Further, any two or more of the functions of the data collection device 10 may be integrated into one function and implemented. Further, any of the functions of the data server 20 may be implemented by dividing one function into a plurality of functions. Further, any two or more functions of the data server 20 may be integrated into one function and implemented.

Further, the data collection device 10 may be a device that is realized by one casing or may be a system that is realized from a plurality of devices connected via a network or the like. For example, the data collection device 10 may be a virtual device such as a cloud service that is provided by a cloud computing system. Further, the data collection device 10 may be a general-purpose computer such as a server device or may be a dedicated device with limited functions.

Further, the data server 20 may be a device that is realized by one casing or may be a system that is realized from a plurality of devices connected via a network or the like. For example, the data server 20 may be a virtual device such as a cloud service that is provided by a cloud computing system. Further, the data server 20 may be a general-purpose computer such as a server device or may be a dedicated device with limited functions.

Further, at least one of the above-described functions of the data collection device 10 may be realized in another device. That is, the data collection device 10 need not have all of the above functions and may have some of the functions. Further, at least one of the above functions of the data server 20 may be realized in another device. That is, the data server 20 need not have all of the above functions and may have some of the functions.

For example, the function of the time stamp adder 102 described with reference to FIG. 1 may be realized in each sensor. That is, in the data collection device 10 of the embodiment, each function of the time stamp adder 102 realized in each sensor may allow the time information to be directly acquired from the GPS device and allow the time stamp to be added in each sensor. The time stamp added in the sensor can be collected in the data collector 101 together with the data output from the sensor.

Further, all of the functions of the data collection device 10 may be realized in a sensor (the same housing as the sensor). For example, among the plurality of sensors, the function of the data collection device 10 may be mounted on a specific sensor, and the other sensors may be connected to a specific sensor to collect data. By realizing the function of the data collection device 10 with the same housing as the sensor, for example, it is possible to save space in the installation of the data collection device 10 and to impart excellent environmental resistance performance of the housing of the sensor to the data collection device 10.

Figure 2:
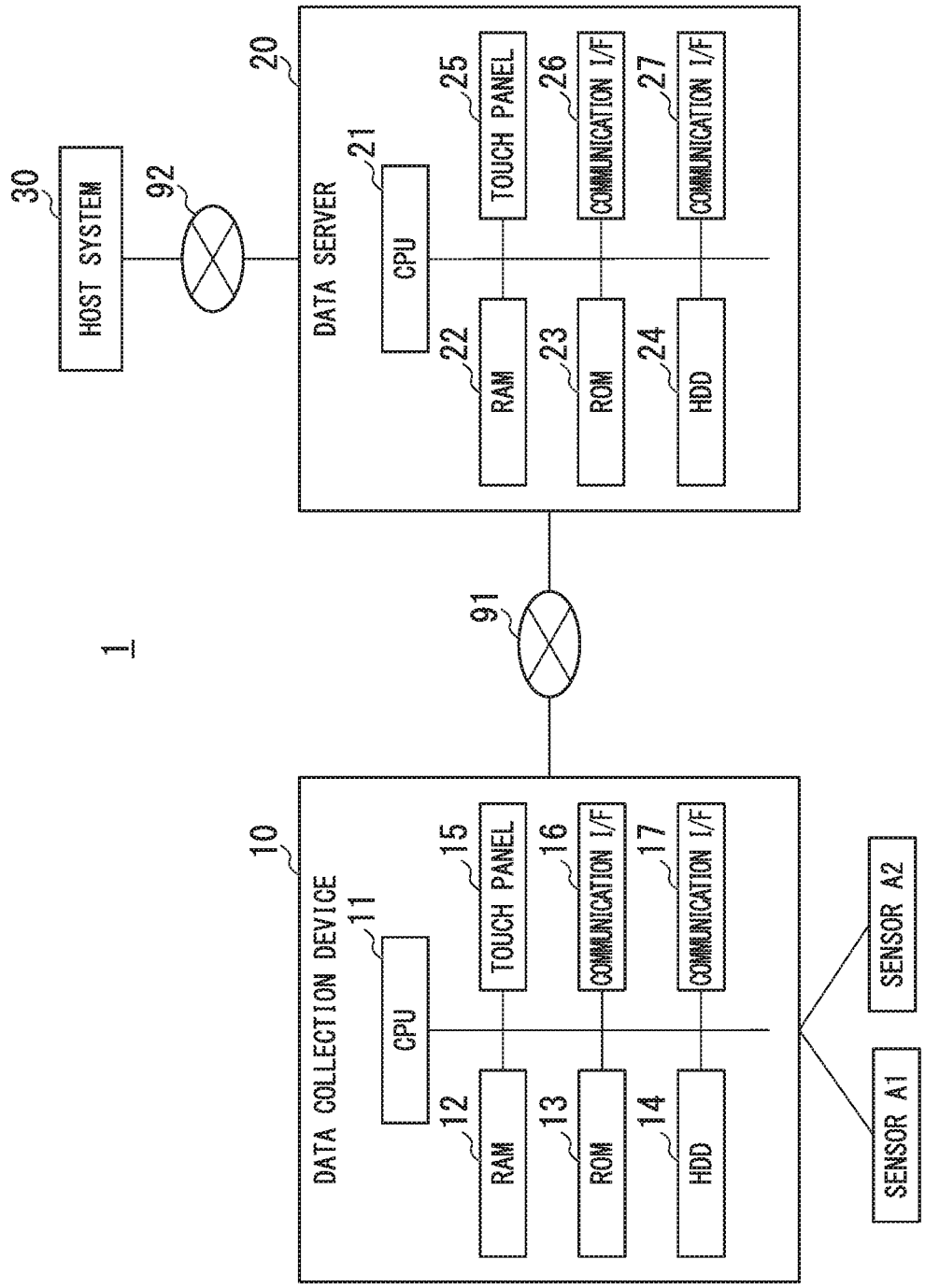
FIG. 2 is a block diagram illustrating an example of a hardware configuration of the data collection system including the data collection device in the embodiment.

Next, a hardware configuration of the data collection system will be described with reference to FIG. 2. FIG. 2 is a block diagram illustrating an example of the hardware configuration of the data collection system including the data collection device according to the embodiment. Note that, in the following description, description of a configuration of the data server 20 that is the same as the data collection device 10 will be omitted.

The data collection device 10 includes a central processing unit (CPU) 11, a RAM 12, a read only memory (ROM)

13, an HDD 14, a touch panel 15, a communication interface (I/F) 16, and a communication I/F 17.

The data collection device 10 is a general-purpose device such as a server device, a desktop type PC or a tablet type PC, or a device dedicated to data collection. The data collection device 10 executes the data collection program described with reference to FIG. 1.

The CPU 11 controls the data collection device 10 by executing a data collection program stored in the RAM 12, the ROM 13, or the HDD 14. The data collection program is acquired, for example, from a storage medium on which the data collection program is recorded or from a program distribution server via the network, installed in the HDD 14, and stored in the RAM 12 so that the data collection program can be read from the CPU 11.

The touch panel 15 has an operation display function having an operation input function and a display function. The touch panel 15 enables an operator to input an operation using a fingertip, a touch pen, or the like. Although the case in which the data collection device 10 uses the touch panel 15 having the operation display function will be described in the embodiment, the data collection device 10 may individually have a display device having a display function and an operation input device having an operation input function. In this case, a display screen of the touch panel 15 can be implemented as a display screen of the display device, and an operation of the touch panel 15 can be implemented as an operation of the operation input device. Note that the touch panel 15 may be realized in various forms such as a head mount type, glasses type, or wristwatch type display.

A communication I/F 16 controls communication in the first network 91. The first network is, for example, general-purpose communication such as wireless LAN communication, wired LAN communication, infrared communication, or short-distance wireless communication. Further, the communication I/F 16 may be another data collection device, a field device capable of general-purpose communication, a maintenance information management server that manages maintenance information, a distributed control system (DCS) control device, or a PLC, which is not illustrated.

The communication I/F 17 is, for example, an analog input module that controls communication with the sensor A1 or the like.

In the data server 20, the communication I/F 26 controls communication in the first network 91. The communication I/F 27 controls communication in the second network 92.

Figure 3:
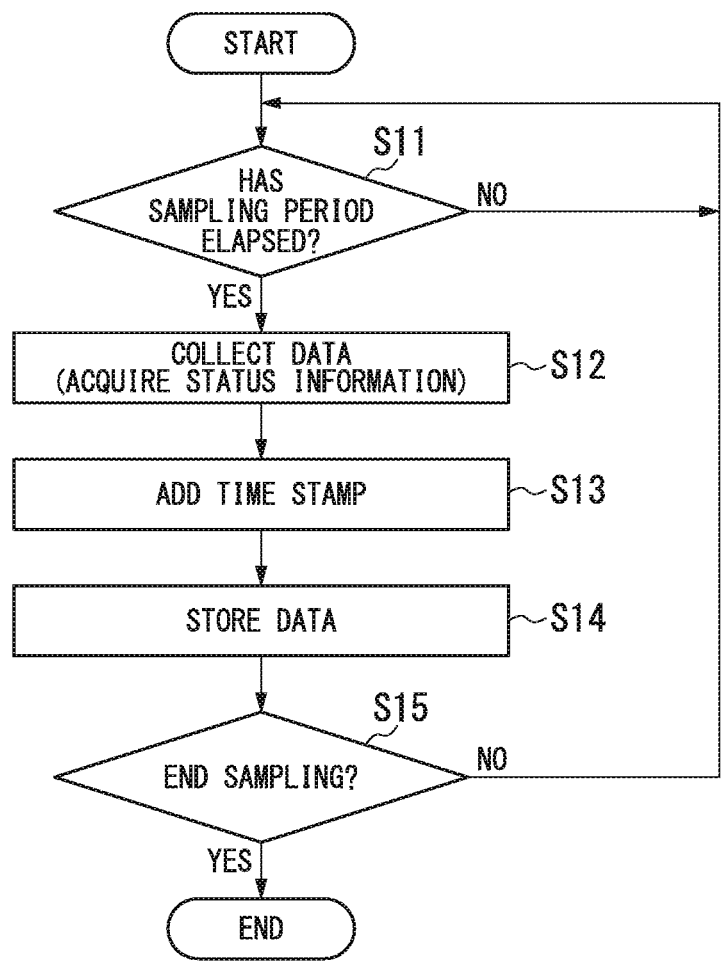
FIG. 3 is a flowchart illustrating an example of a data collection operation of the data collection device in the embodiment.

Next, a data collection operation of the data collection device 10 will be described with reference to FIG. 3. FIG. 3 is a flowchart illustrating an example of the data collection operation of the data collection device according to the embodiment.

In FIG. 3, the data collection device 10 determines whether or not the sampling period has elapsed (step S11). The determination as to whether or not the sampling period has elapsed can be executed, for example, by the data collector 101 determining the elapse of a predetermined period which is determined in advance based on a value of the timer or the like. When the determination is made that the sampling period has not elapsed (step S11: NO), the data collection device 10 repeats the process of step S11 and waits for the elapse of the sampling period.

On the other hand, when the determination is made that the sampling period has elapsed (step S11: YES), the data collection device 10 collects data output by the device (step S12). The collection of the data can be performed, for example, by the data collector 101 performing AD conversion of analog data output from the device into digital data. The data collection device 10 may acquire the status information indicating whether or not the device is normal together with the data.

After executing the process of step S12, the data collection device 10 adds a time stamp to the collected data (step S13). The addition of the time stamp can be executed, for example, by the time stamp adder 102 acquiring the time information from the time server 50.

After executing the process of step S13, the data collection device 10 stores the data to which the time stamp has been added (step S14). The storage of the data can be executed, for example, by the data storage 103 storing the data in the HDD 14.

After executing the process of step S14, the data collection device 10 determines whether or not to end a data sampling operation (step S15). The determination as to whether or not to end the sampling operation can be made, for example, by the data collection device 10 detecting whether or not an end operation with respect to the touch panel 15 has been executed by the operator. When the determination is made that the sampling operation is not to be ended (step S15: NO), the data collection device 10 repeats the processes of steps S11 to S15. On the other hand, when the determination is made that the sampling operation is to be ended (step S15: YES), the data collection device 10 ends the operation shown in the flowchart.

Figure 4:
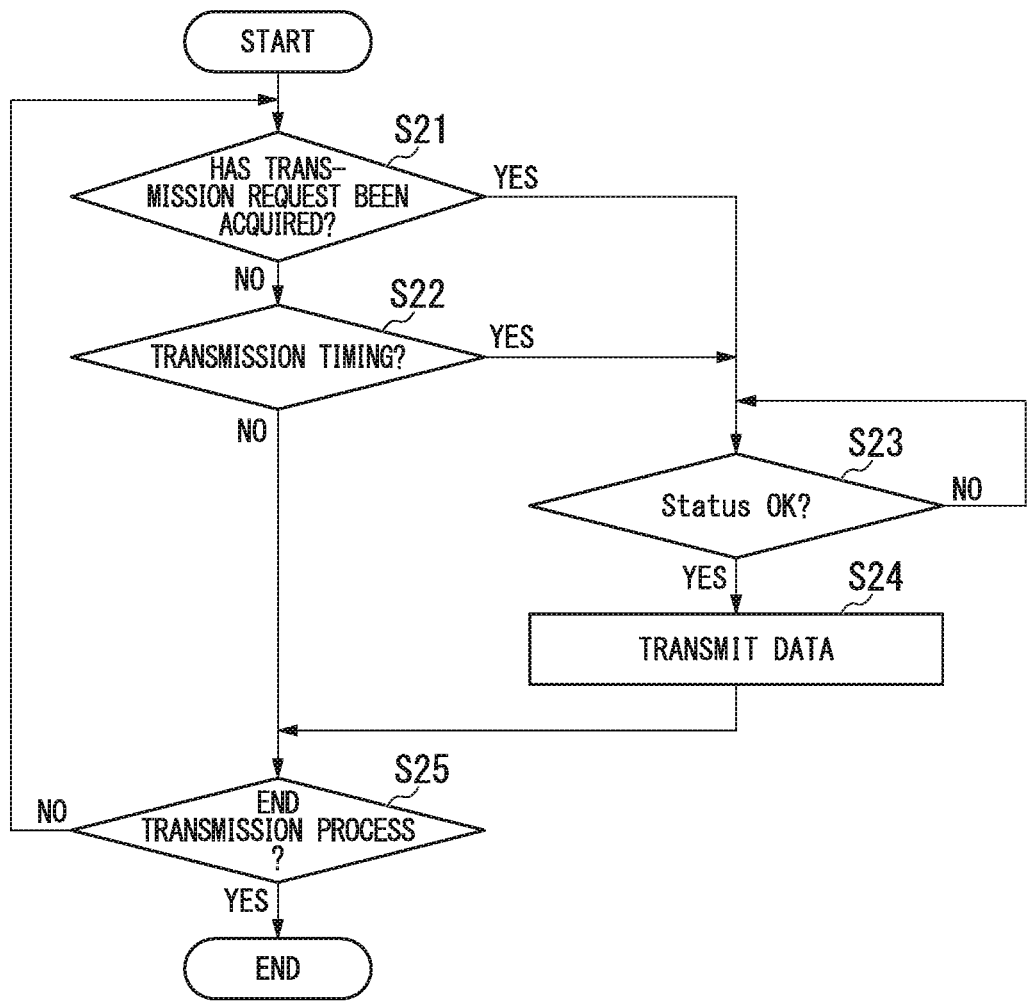
FIG. 4 is a flowchart illustrating an example of a data transmission operation of the data collection device in the embodiment.

Next, the data transmission operation of the data collection device 10 will be described with reference to FIG. 4. FIG. 4 is a flowchart illustrating an example of the data transmission operation of the data collection device according to the embodiment.

In FIG. 4, the data collection device 10 determines whether or not a data transmission request has been acquired from the data server 20 (step S21). The determination can be made as to whether or not the data transmission request has been acquired, for example, based on whether or not the request information acquirer 105 has acquired the request information from the data server 20. The request information is generated by the request information generator 201, for example, in response to a request from the host system 30, and is transmitted to the data collection device 10 by the request information transmitter 202.

When the determination is made that the transmission request has not been acquired (step S21: NO), the data collection device 10 determines whether the transmission timing has been reached (step S22). The determination is made as to whether the transmission timing has been reached or not can be made, for example, based on whether or not the timing generator 104 has generated the transmission timing. The timing generator 104, for example, determines whether or not a predetermined sampling period has elapsed or determines whether the number of pieces of stored data or the amount of data has reached a predetermined value to generate a timing.

When the determination is made that the transmission request has been acquired in the process of step S21 (step S21: YES) or when the determination is made that the transmission timing has been reached in the process of step S22 (step S22: YES), the data collection device 10 determines whether or not a communication status with the data server 20 is OK (normal) (step S23). The communication status can be determined, for example, by transmitting a command for a communication test. When the determination is made that the communication status with the data server 20 is not OK (not normal) (step S23: NO), the data collection device 10 repeats the process of step S23 and waits for the communication status to be OK (normal).

On the other hand, when the determination is made that the communication status with the data server 20 is OK (normal) (step S23: YES), the data collection device 10 transmits the data to the data server 20 (step S24). The transmission of the data can be executed, for example, by the data transmitter 106 transmitting the data stored in the data storage 103.

After the process of step S24 has been executed or when the determination has been made that the transmission timing has not reached in the process of step S22 (step S22: NO), the data collection device 10 determines whether or not to end the transmission process (step S25). The determination is made as to whether or not to end the transmission process can be made, for example, by the data collection device 10 detecting whether or not an end operation with respect to the touch panel 15 has been executed by an operator. When the determination is made that the transmission process is not to be ended (step S25: NO), the data collection device 10 repeats the process of steps S21 to S25. On the other hand, when the determination is made that the transmission process is to be ended (step S25: YES), the data collection device 10 ends the operation shown in the flowchart.

Note that the data acquisition of the data server 20 from the data collection device 10 is executed by the data acquirer 203 acquiring the data transmitted in the data transmission process of step S24 and storing the data in the database 204.

Figure 5:
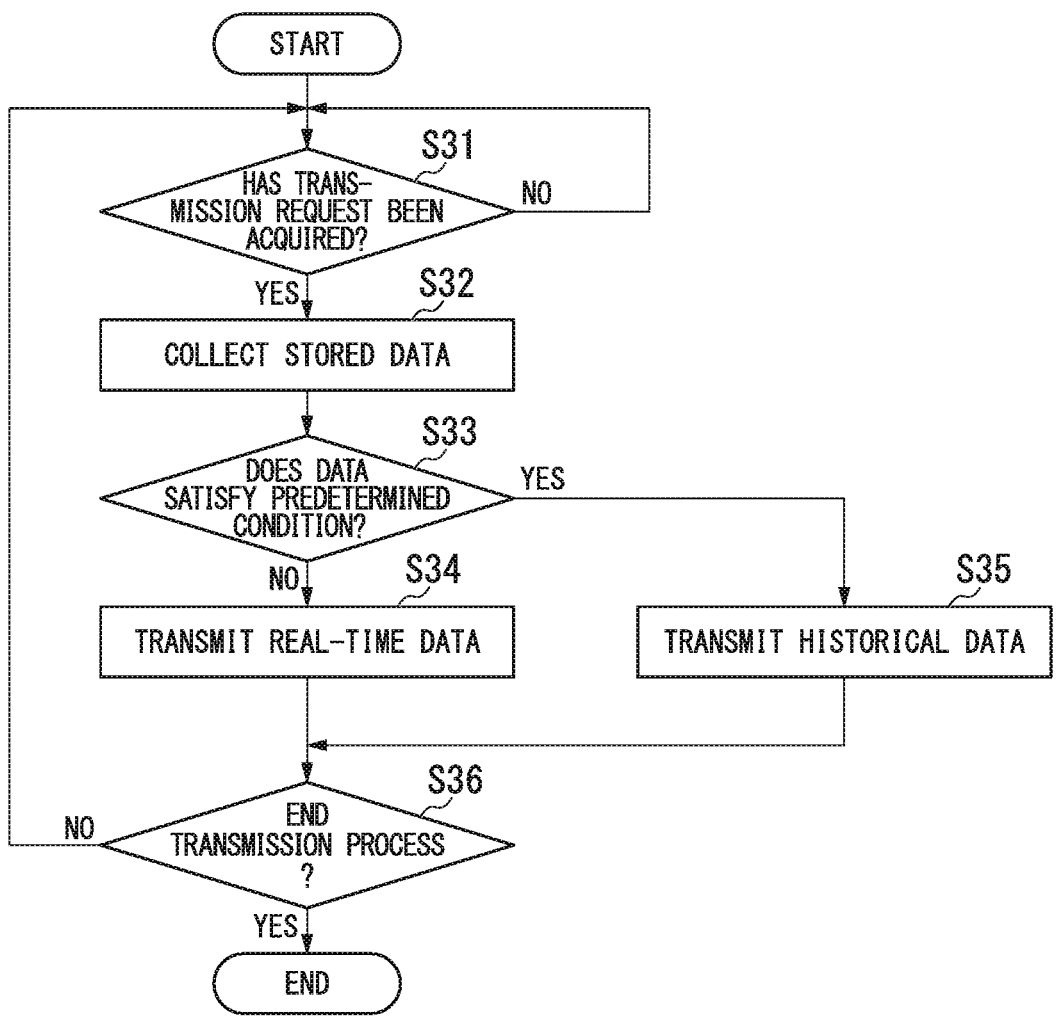
FIG. 5 is a flowchart illustrating an example of a data transmission operation of a data server in the embodiment.

Next, the data transmission operation of the data server 20 will be described with reference to FIG. 5. FIG. 5 is a flowchart illustrating an example of the data transmission operation of the data server in the embodiment.

In FIG. 5, the data server 20 determines whether or not the data transmission request has been acquired from the host system 30 (step S31). The determination as to whether or not the data transmission request has been acquired from the host system 30 can be made, for example, according to whether or not the server data transmitter 205 has received a predetermined command from the host system 30. When the determination is made that the data transmission request has not been acquired (step S31: NO), the data server 20 repeats the process of step S31 and waits for acquisition of the data transmission request.

When the determination has been made that the data transmission request has been acquired (step S31: YES), the data server 20 collects the data stored in the database 204 (step S32). The collection of the data is executed, for example, by the host system designating an ID of the sensor, a range of the time stamp, or the like to specify data serving as a collection target.

After executing the process of step S32, the data server 20 analyzes the collected data and determines whether or not the predetermined condition is satisfied (step S33). The determination as to whether or not the predetermined condition is satisfied can be made, for example, by the data analyzer 206 acquiring data of a specific sensor over time and determining whether a rate in change or the amount of change in the data within a predetermined period has exceeded a preset range. Further, the data analyzer 206, for example, may compare trends of a plurality of sensors and specify a sensor in which a change in the trend is abnormal.

When the determination is made that the predetermined condition is not satisfied (step S33: NO), the data server 20 executes transmission of real-time data (step S34). The transmission of the real-time data can be executed, for example, by the OPC server 207 transmitting non-transmitted data stored in the database 204 to the host system 30 using OPC-DA. In step S34, the data server 20 may execute another process using OPC-DA.

On the other hand, when the determination is made that the predetermined condition is satisfied (step S33: YES), the data server 20 executes transmission of historical data (step S35). The transmission of historical data can be executed, for example, by the OPC server 207 transmitting a history of data including data transmitted in the past to the host system 30 using OPCHDA. In step S35, the data server 20 may execute another process using the OPCHDA. That is, in the embodiment, the data server 20 can switch between the interfaces of OPC-DA and OPCHDA of the OPC server 207 based on the data stored in the database 204 and execute transmission and reception of the data to and from the host system 30.

After executing the process of step S34 or after executing the process of step S35, the data server 20 determines whether or not to end the data transmission process (step S36). The determination as to whether or not to end the transmission process can be made, for example, by the data server 20 detecting whether or not an end operation with respect to the touch panel 25 has been executed by the operator. When the determination is made that the data transmission process is not to be ended (step S36: NO), the data server 20 repeatedly executes the processes of steps S31 to S36. On the other hand, when the determination is made that the data transmission process is to be ended (step S36: YES), the data server 20 ends an operation shown in a flowchart.

Next, the data stored in the data collection device will be described with reference to FIG. 6A and FIG. 6B. FIG. 6A and FIG. 6B are diagrams illustrating an example of the data stored in the data collection device according to the embodiment.

FIG. 6A illustrates the data stored in the data storage 103 of the data collection device 10 described with reference to FIG. 1. A data item "Time Stamp" indicates time information of the time stamp added to the data acquired from the sensor A1 or the sensor A2. A data item "Sensor ID" indicates identification information of the sensor. A data item "Data" indicates digital data output from the sensor or data obtained by performing AD conversion on an analog value output from the sensor. Further, a data item "Status" indicates status information indicating whether or not the sensor is normal. For example, timestamps have been added to the sensors A1 and A2 at times "tA-1" and "tA-2". Here, since the times "tA-1" and "tA-2" of "Time Stamp" can be adjusted according to a processing speed at which the AD conversion of data is performed, a time at which data has been acquired and a time that is added in the time stamp can be made to substantially match each other. That is, the time stamp can be added to the collected data in real time. Further, the status information indicates that all pieces of data have been acquired from sensors that are operating normally.

FIG. 6B illustrates data stored in the data storage 103 of the second data collection device 10B, which is not illustrated in FIG. 1. The data collection device 10B is assumed to acquire the data from the sensors B1 and B1. Here, the status information at "tB-2" of the sensor B2 is NG. That is, the data acquired at "tB-2" indicates data acquired from a sensor of which the status is not normal. It is possible to improve accuracy of the analysis by not using data of which the status is NG as, for example, an analysis target in the data analyzer 206.

Note that the time of the time stamp is assumed to proceed in an order of tA-1, tB-1, tA-2, and tB-2 in which tA-1 is oldest.

Next, the data stored in the data server 20 will be described with reference to FIG. 7. FIG. 7 is a diagram illustrating an example of the data stored in the data server in the embodiment. FIG. 7 illustrates a state in which the data server 20 collects the data stored in the data storage 103 illustrated in FIG. 6A and FIG. 6B, and stores the data in the database 204.

In FIG. 7, time information of the time stamp is added to a data item "Time Stamp" in an order of tA-1, tB-1, tA-2, and tB-2 as described above. The database 204 can unitarily manage data acquired from a plurality of data collection devices 10. As described above, in each data collection device 10, the time stamp adder 102 can add accurate time information. Therefore, the collected data can be used for various types of data analysis based on the time information, the data, and information on an installation position of the sensor by unitarily managing the data acquired from the plurality of data collection devices 10. For example, when the speed of the vehicle is measured by the sensor and speed data is collected, it is possible to recognize a travelling situation such as a situation of acceleration/deceleration of the vehicle by recording the speed data and the time information at the disposition position of the respective sensors.

Figure 8:
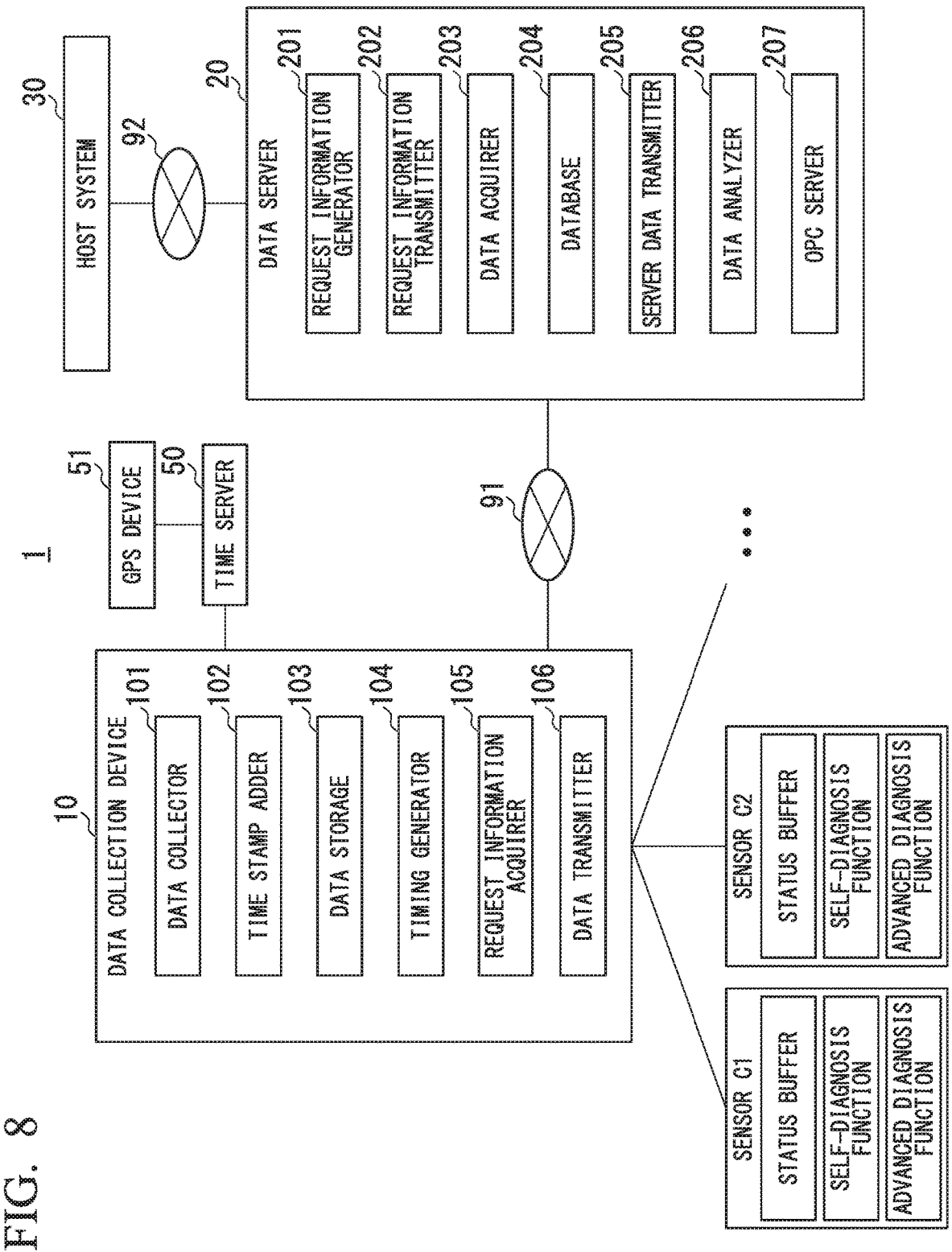
FIG. 8 is a block diagram illustrating another example of the software configuration of the data collection system including the data collection device in the embodiment.

Next, another example of the software configuration of the data collection system 1 will be described with reference to FIG. 8. FIG. 8 is a block diagram illustrating another example of the software configuration of the data collection system including the data collection device according to the embodiment. In FIG. 8, the same components as those in FIG. 1 are denoted by the same reference numerals, and description thereof is omitted.

In FIG. 8, the data collection device 10 is connected to a plurality of sensors C (including a sensor C1, a sensor C2, and the like). Each of the sensors C has a status buffer, a self-diagnosis function, and an advanced diagnosis function. Note that the sensor C may have at least one of the self-diagnosis function and the advanced diagnosis function.

The self-diagnosis function detects an abnormality of the sensor C itself. Examples of an abnormality of the sensor C itself include, for example, an abnormality of a built-in circuit of the sensor C, an abnormality of an internal memory of the sensor, and an abnormality of communication between the sensor C and the data collection device 10. The sensor C stores a diagnosis result using the self-diagnosis function as a self-diagnosis result in the status buffer. The self-diagnosis result is provided to the data collection device 10 together with measurement data (either an analog value or a digital value) such as a differential pressure, a temperature, and a flow rate stored in the status buffer. Accordingly, it possible to improve reliability of the measurement data provided to the data collection device 10. By adding the time stamp to the acquired data and the self-diagnosis result, the data collection device 10 can further improve the reliability of the measurement data and easily perform temporal analysis of the measurement data or the self-diagnosis result.

Further, the advanced diagnosis function is a function of detecting an abnormality of a measurement environment of the sensor C such as an abnormality of fluid, such as detection of adhesion of extraneous substances to a detector of the sensor C, blockage of impulse-line for measurement of differential pressure or a flow rate, or a pulsating flow or inclusion of air bubbles. For example, the sensor C detects a flow rate of fluid, and detects the abnormality of the measurement environment of the sensor C based on the detected flow rate. The sensor C stores a diagnosis result using the advanced diagnosis function in the status buffer as an advanced diagnosis result. The advanced diagnosis result is provided to the data collection device 10 together with the measurement data stored in the status buffer. Accordingly, it is possible to improve the reliability of the measurement data provided to the data collection device 10. In the data collection device 10, by adding the time stamp to the acquired data and the self-diagnosis result, it is possible to further improve the reliability of the measurement data and easily perform temporal analysis of the measurement data or the self-diagnosis result. Note that the advanced diagnostic function is a function of detecting data for determining an abnormality in the measurement environment, and details of the determination can be executed in the host system 30, for example.

Next, another example of the data stored in the data collection device 10 will be described with reference to FIG. 9. FIG. 9 is a diagram illustrating another example of the data stored in the data collection device according to the embodiment.

FIG. 9 illustrates data stored in the data storage 103 of the data collection device 10. Since a data item "Time Stamp", a data item "Sensor ID", and a data item "Data" are the same as the data items described with reference to FIG. 6A and FIG. 6B, description thereof will be omitted. The data item "Self-diagnosis result" is a result of diagnosis using the self-diagnosis function of the sensor C. Further, the data item "Advanced diagnosis result" is a result of diagnosis using the advanced diagnosis function of the sensor C. "Self-diagnosis result" and "Advanced diagnosis result" are recorded together with the measurement data recorded in the data item "Data", and a time stamp is added. For example, both the self-diagnosis result and the advanced diagnosis result are recorded at a time "tC-1". That is, the data collection device 10 adds a time stamp to the measurement data, the self-diagnosis result, and the advanced diagnosis result. At a time "tC-2", the self-diagnosis result is recorded. That is, the data collection device 10 adds a time stamp to the measurement data and the self-diagnosis result. Further, at a time "tC-3", the advanced diagnosis result is recorded. That is, the data collection device 10 adds a time stamp to the measurement data and the advanced diagnosis result. At a time "tC-4", neither the self-diagnosis result nor the advanced diagnosis result are recorded. That is, the data collection device 10 can arbitrarily store the self-diagnosis result and the advanced diagnosis result together with the measurement data and add a time stamp.

Figure 10:
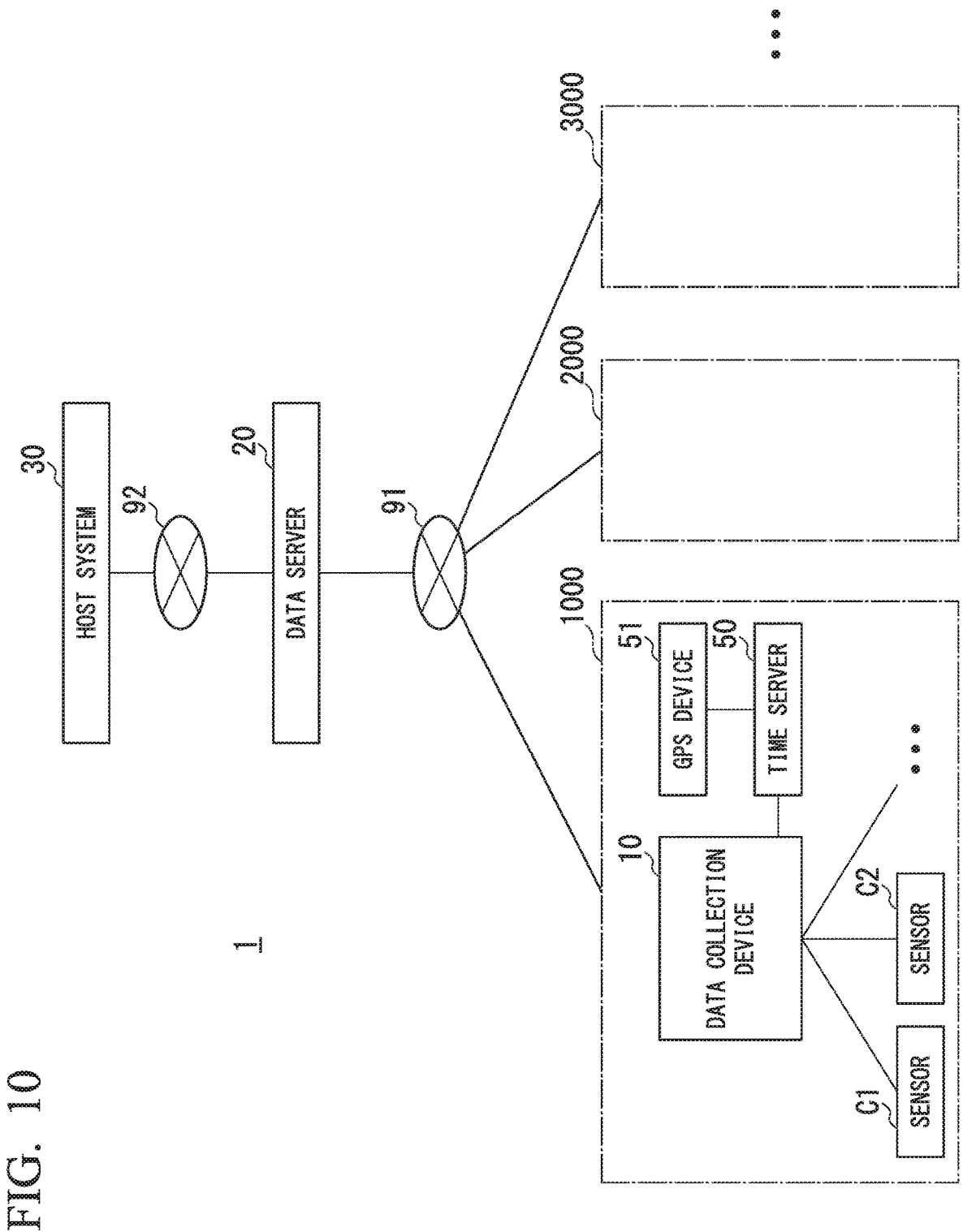
FIG. 10 is a block diagram illustrating an example of a data collection system including a plurality of data collection devices in the embodiment.

Next, a data collection system including a plurality of data collection devices 10 will be described with reference to FIG. 10. FIG. 10 is a block diagram illustrating an example of the data collection system including a plurality of data collection devices in the embodiment.

In FIG. 10, a system 1000 includes, for example, the data collection device 10, the sensor group (the sensor C1, the sensor C2, and the like), the time server 50, and the GPS device 51. The data server 20 is connected to a system 2000 and a system 3000 that are the same as the system 1000 via the network 91. That is, the data server 20 collects data to which a time stamp has been added from the system 1000, the system 2000, and the system 3000. Thus, for example, even with locations where the system 1000, the system 2000, and the system 3000 are geographically distant from each other, when a time lag occurs in communication, it is possible to unitarily collect and record the data according to the time stamps. Note that the network 91 may be a wired network or a wireless network.

As described above, the data collection device according to the embodiment includes the data collector that collects data from the device that outputs data, the time stamp adder that adds the time stamp to the collected data, the data storage that stores the data to which the time stamp has been added, the timing generator that generates the timing at which the stored data is transmitted to the data server communicably connected via the first network, the request information acquirer that acquires the request information for requesting transmission of the data, which is transmitted from the data server, and the data transmitter that transmits the stored data to the data server based on the generated timing and according to the acquired request information. With this configuration, it is possible to perform stable analysis according to the time stamp of the data acquired from the data input device.

Note that the above-described data collection device may be any device having the above-described function, and may be realized by, for example, a system configured of a combination of a plurality of devices in which the respective devices are communicably connected to each other. Further, the data collection device may be realized as some of functions of another device connected via a network.

Note that the respective steps in the data collection method or the respective processes in the data collection program and the storage medium described in the embodiment are not limited in execution order.

Further, various processes of the embodiment described above may be executed by recording a program for realizing the functions of the device described in the embodiment in a computer-readable storage medium, loading the program recorded on the storage medium to a computer system, and executing the program. Note that the "computer system" referred to herein may include an OS or hardware such as a peripheral device. Further, the "computer system" also includes a homepage providing environment (or display environment) when a system including web server is used. Further, the "computer-readable storage medium" refers to a flexible disk, a magneto-optical disc, a ROM, or a writable nonvolatile memory such as a flash memory, a portable medium such as a CD-ROM, or a storage device such as a hard disk built into the computer system.

Further, the "computer-readable storage medium" also includes a storage medium that holds a program for a certain time, such as a volatile memory (for example, a dynamic random access memory (DRAM)) inside a computer system including a server and a client when a program is transmitted via a network such as the Internet or a communication line such as a telephone line. Further, the above program may be transferred from a computer system in which the program is stored in a storage device or the like to other computer systems via a transmission medium or by transmission waves in the transmission medium. Here, the "transmission medium" for transmitting the program refers to a medium having a function of transferring information, such as a network (communication network) such as the Internet or a communication line such as a telephone line. Further, the above program may be a program for realizing some of the above-described functions. Further, the program may be a program capable of realizing the above-described functions in combination with a program previously stored in a computer system, that is, a differential file (a differential program).

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A data collection system comprising:
a data server; and
a plurality of data collection devices which are communicably connected via a first network to the data server,
wherein each of the data collection devices comprises:
a memory that stores a program; and
a processor configured to execute the program stored in the memory to implement:
  a data collector configured to collect data from a data input device that generates data indicating a physical quantity;
  a time stamp adder configured to add a time stamp to the data collected by the data collector;
  a data storage configured to store the data to which the time stamp is added by the time stamp adder;
  a timing generator configured to generate a timing at which the data stored in the data storage is transmitted to the data server;
  a request information acquirer configured to acquire request information for requesting transmission of the data, the request information being transmitted from the data server; and
  a data transmitter configured to transmit the data stored in the data storage to the data server based on the timing generated by the timing generator and in accordance with the request information acquired by the request information acquirer,
    wherein time servers, which are different from each other and each of which provides time information, are respectively provided for the data collection devices,
wherein the data collection devices are directly connected to the time servers respectively without passing through any network,
wherein the time stamp adder adds the time stamp to the data based on the time information provided by one of the time servers before the data is transmitted via the first network to the data server by the data transmitter, wherein when the request information acquirer has acquired the request information from the data server, the data transmitter monitors a communication status indicating whether or not a communication with the data server is possible, and when the communication status indicates that the communication is possible, the data transmitter transmits the data stored in the data storage to the data server, wherein when the request information acquirer has not acquired the request information from the data server, the data transmitter monitors the communication status, and when the communication status indicates that the communication is possible, the data transmitter transmits the data stored in the data storage to the data server, wherein when a change which is larger than a predetermined value does not occur in the data, the data transmitter transmits the data at a low transmission frequency, and when the change which is larger than the predetermined value occurs in the data, the data transmitter transmits the data at a high transmission frequency, and wherein when the communication status indicates that the communication is not possible, the data transmitter waits for the communication status to indicate that the communication is possible.

2. The data collection system according to claim 1, wherein the request information acquirer acquires the request information, the request information being transmitted from the data server in response to a request from a host system communicably connected to the data server via a second network.

3. The data collection system according to claim 1, wherein the time stamp adder adds the time stamp based on a time obtained from GPS (Global Positioning System) information.

4. The data collection system according to claim 1, wherein the data collector collects status information of the data input device together with the data, and wherein the data transmitter transmits the status information together with the data.

5. The data collection system according to claim 4, wherein the data collector collects, as the status information, a self-diagnosis result obtained by diagnosing whether or not the data input device is abnormal in the data input device.

6. The data collection system according to claim 4, wherein the data collector collects, as the status information, an advanced diagnosis result obtained by diagnosing a measurement environment of the data input device in the data input device.

7. The data collection system according to claim 4, wherein the data transmitter further transmits an alarm that is issued from the data input device when the data input device is not normal.

8. The data collection system according to claim 1, wherein the first network comprises a communication path for wireless communication, and wherein the data transmitter transmits the data to the data server through the wireless communication.

9. The data collection system according to claim 1, wherein the data server comprises:

a request information generator configured to generate the request information in response to a request from the host system;

a request information transmitter configured to transmit the request information generated by the request information generator to the data collection device via the first network;

a data acquirer configured to acquire the data transmitted from the data collection device;

a database configured to store the data acquired by the data acquirer; and a server data transmitter configured to transmit the data stored in the database to the host system.

10. The data collection system according to claim 9, wherein the data server further comprises:

a data analyzer configured to determine whether or not the data stored in the database satisfies a predetermined condition, wherein when the data analyzer determines that the predetermined condition is not satisfied, the server data transmitter transmits the data which is stored in the database and has not been transmitted yet, and wherein when the data analyzer determines that the predetermined condition is satisfied, the server data transmitter transmits historical data which is a history of data including data transmitted in the past.

11. The data collection system according to claim 9, wherein the data acquirer acquires the data from a plurality of data collection devices.

12. A data collection method for controlling a data collection system which comprising a data server and a plurality of data collection devices which are communicably connected via a first network to the data server, the data collection method comprising:

collecting data from a data input device that generates data indicating a physical quantity;

adding a time stamp to the collected data;

storing the data to which the time stamp is added;

generating a timing at which the stored data is transmitted to the data server;

acquiring request information for requesting transmission of the data, the request information being transmitted from the data server; and transmitting the stored data to the data server based on the generated timing and according to the acquired request information, wherein time servers, which are different from each other and each of which provides time information, are respectively provided for the data collection devices, wherein the data collection devices are directly connected to the time servers respectively without passing through any network, wherein the data collection method further comprises:

adding the time stamp to the data based on the time information provided by one of the time servers before the data is transmitted via the first network to the data server;

in response to determining that the request information from the data server has been acquired, monitoring a communication status indicating whether or not a communication with the data server is possible, and in response to the communication status indicating that the communication is possible, transmitting the stored data to the data server, in response to determining that the request information from the data server has not been acquired, monitoring the communication status, and in response to the communication status indicating that the communication is possible, transmitting the stored data to the data server, in response to determining that a change which is larger than a predetermined value does not occur in the data, transmitting the data at a low transmission frequency, and in response to determining that the change which is larger than the predetermined value occurs in the data, transmitting the data at a high transmission frequency, and in response to the communication status indicating that the communication is not possible, waiting for the communication status to indicate that the communication is possible.

13. The data collection method according to claim 12, further comprising:

acquiring the request information, the request information being transmitted from the data server in response to a request from a host system communicably connected to the data server via a second network.

14. The data collection method according to claim 12, further comprising:

adding the time stamp based on a time obtained from GPS (Global Positioning System) information.

15. The data collection method according to claim 12, further comprising:

collecting status information of the device together with the data; and transmitting the status information together with the data.

16. The data collection method according to claim 15, further comprising:

collecting, as the status information, a self-diagnosis result obtained by diagnosing whether or not the device is abnormal in the device.

17. The data collection method according to claim 15, further comprising:

collecting, as the status information, an advanced diagnosis result obtained by diagnosing a measurement environment of the device in the device.

18. A non-transitory computer readable storage medium storing one or more data collection programs configured for execution by a computer of a data collection system which comprising a data server and a plurality of data collection devices which are communicably connected via a first network to the data server, the one or more data collection programs comprising instructions for:

collecting data from a data input device that generates data indicating a physical quantity;

adding a time stamp to the collected data;

storing the data to which the time stamp is added;

generating a timing at which the stored data is transmitted to the data server;

acquiring request information for requesting transmission of the data, the request information being transmitted from the data server; and transmitting the stored data to the data server based on the generated timing and according to the acquired request information, wherein time serves, which are different from each other and each of which provides time information, are respectively provided for the data collection devices, wherein the data collection devices are directly connected to the time servers respectively without passing through any network, wherein the one or more data collection programs further comprises instructions for:

adding the time stamp to the data based on the time information provided by one of the time servers before the data is transmitted via the first network to the data server;

when the request information from the data server has been acquired, monitoring a communication status indicating whether or not a communication with the data server is possible, and when the communication status indicates that the communication is possible, transmitting the stored data to the data server, when the request information from the data server has not been acquired, monitoring the communication status, and when the communication status indicates that the communication is possible, transmitting the stored data to the data server, when a change which is larger than a predetermined value does not occur in the data, transmitting the data at a low transmission frequency, and when the change which is larger than the predetermined value occurs in the data, transmitting the data at a high transmission frequency, and when the communication status indicates that the communication is not possible, waiting for the communication status to indicate that the communication is possible.

* * * * *